Sept. 4, 1962 R. J. THOMAS 3,052,506
DISPOSABLE CAR TRAY
Filed Aug. 30, 1961
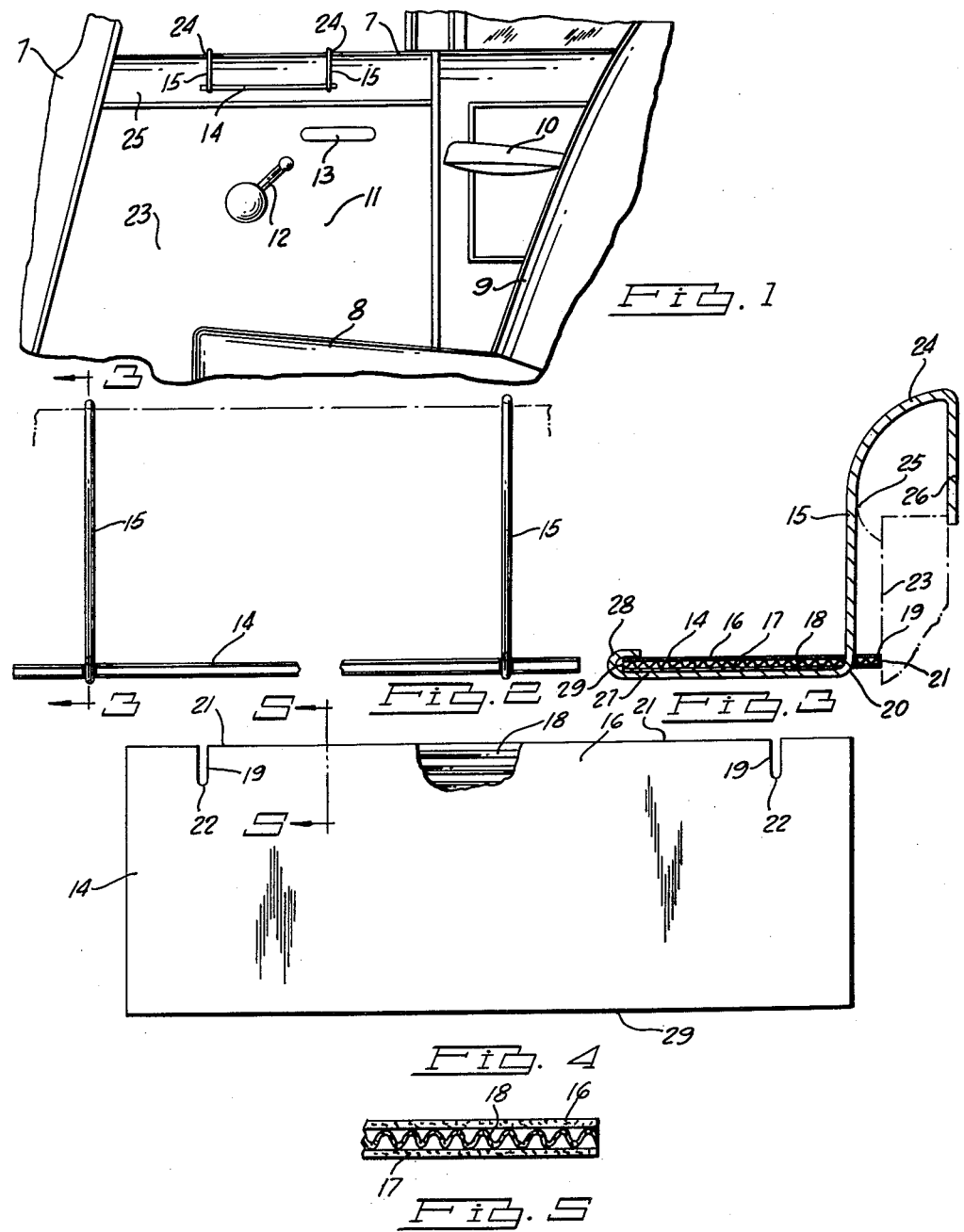
INVENTOR.
ROBERT J. THOMAS
BY Edward M. Apple
ATTORNEY United States Patent Office 3,052,506
Patented Sept. 4, 1962

3,052,506
DISPOSABLE CAR TRAY
Robert J. Thomas, 3451 Academy, Dearborn, Mich.
Filed Aug. 30, 1961, Ser. No. 134,928
1 Claim. (Cl. 311—22)

This invention relates to automobile accessories and has particular reference to a disposable tray which may be used on the interior of a motor vehicle, for the convenience of the passengers, for holding food and drink and the like.

This invention is considered a continuation-in-part of the invention disclosed in my co-pending application, S.N. 130,091, filed August 8, 1961.

An object of the invention is to provide a device which is simple in construction and economical to manufacture and one which may be easily disposed of after use, or stored for future use in a minimum of space.

A further object of the invention is to provide a device of the character indicated, which may be stored or transported in a flat condition and may be assembled for use without tools in a matter of a few seconds.

Another object of the invention is to improve the device disclosed in my co-pending application.

A further object of the invention is to provide a device of the character indicated, which is fabricated, in large part, from a single sheet of cardboard, or the like, which may also serve as the carrier for intelligible subject matter, such as advertising, or the like.

Another object of the invention is to provide a disposable car tray which is fabricated of a single length of corrugated cardboard, or the like, which is provided with means for supporting it on a side wall of the motor vehicle with means for preventing the downward thrust of the tray under the impact of comparatively heavy loads.

The foregoing and other objects and the advantages of the invention will become more apparent as the description proceeds, reference being made from time to time to the accompanying drawing, forming part of the within disclosure, in which drawing:

FIG. 1 is a fragmentary elevational view of the interior of an automobile, to the door of which is secured a device embodying the invention.

FIG. 2 is an enlarged elevational detail, with part broken away, of the device shown in FIG. 1.

FIG. 3 is a section taken substantially on the line 3—3 of FIG. 2.

FIG. 4 is a plan view, with parts broken away, of a sheet of corrugated cardboard from which the tray is made, and showing the recesses for receiving the supporting members.

FIG. 5 is a section taken substantially on the line 5—5 of FIG. 1.

Referring now more particularly to the drawings, it will be understood that the reference character 7 indicates, in general, an automobile having a seat 8, a backrest 9, an armrest 10, a door 11, a window lift 12, and a hand grip 13, all of which are conventional parts of a motor vehicle and form no part of the invention, except as they are combined with the structure hereinafter described.

The device embodying the invention consists of a shelf-like tray 14 and a pair of wire hangers 15, which are constructed and arranged as hereinafter described. For the sake of economy, I prefer to make the tray 14 of a sheet of corrugated cardboard, which is constructed as shown in FIGS. 3 and 4, with an upper layer 16, a lower layer 17 and intermediate corrugations 18. This corrugated cardboard may be purchased on the open market and no claim is made to its construction. It is also within the contemplation of the invention to make the tray 14 of any other suitable material, such as a plastic, wood, metal, or other type of material which is comparatively rigid. I prefer, however, to use the corrugated cardboard, as it is comparatively inexpensive and may be disposed of, by burning, after it has been used at a drive-in restaurant, or at a drive-in movie. The cardboard will also lend itself more readily to printing or lithographing thereon.

After the sheet of material is cut to size to form the tray 14, I provide recesses 19 along the rear edge of the tray, which recesses are adapted to receive the curved portion 20 of the hangers 15. When assembled, as shown in FIG. 3, the rear edge 21 of the tray, which is spaced rearwardly from the leading edges 22 of the recesses 19, abuts against the front face of the panel 23 and acts to prevent the downward and rearward displacement of the tray 14, when it is under load.

The hangers 15 are preferably made of individual lengths of stiff wire, which are bent and rebent to form a hook portion 24, which is adapted to be received over the trim moulding 25 of the vehicle door. The depending portion 26 (FIG. 3) of each hanger may be positioned between the front panel of the vehicle door and the door glass (not shown). One of the unique features of the invention is that the door glass, or window glass, may be fully elevated to closed position, after the hanger has been so attached to the door or window frame, so that one or more of the trays may be used in the vehicle with all of the windows closed.

Each hanger 15 has a straight horizontal portion 27 which is adapted to ride under the tray 14 for the purpose of supporting it.

Each hanger 15 is also provided with a front terminal hook portion 28 which is adapted to receive the front, or leading edge, 29 of the tray 14 and prevents the lateral displacement forwardly of the tray. Lateral displacement rearwardly of the tray is prevented by the contact of the hangers with the edges 22 of the recesses 19 and the abutting relation of the rear edge 21 with the front surface of the door panel as previously described.

It will be understood that, without the particular construction and arrangement of the tray 14 and the hangers 15, there would be a tendency for the downward and rearward movement of the tray 14, when weight is placed upon it. Such downward and rearward movement is prevented by the construction and arrangement of the hangers 15 and the recesses 19 and the arrangement of the other elements as hereinabove described.

In assembling the device, I prefer to first secure the hook portion 28 of the hanger about the front edge 29 of the tray and then bring the straight portion 27 of the hanger into contact with the underside of the tray 14, so that the curved portion 20 of the hangers are received in the recesses 19. The device is then ready to be attached to the door, or window sill, of the vehicle, as shown in FIG. 3.

It is believed that the operation of the device is obvious from the foregoing description.

Having described my invention, what I claim and desire to secure by Letters Patent is:

A disposable tray for mounting inside an automobile, with closed windows, comprising a sheet of rigid corrugated cardboard having spaced recesses formed along one longitudinal edge thereof, a pair of wire members, each having a flat portion extending beneath said sheet of rigid material and supporting the same, there being a terminal end on each wire member for preventing the lateral displacement of said sheet, each said wire member having a portion received in one of said recesses and each wire member having a hook element for being received over the lower member of a window frame of the automobile adjacent the closed glass of said window.

(References on following page)

References Cited in the file of this patent

UNITED STATES PATENTS

| | | | |
|---|---|---|---|
| 920,747 | Hughes | May 4, | 1909 |
| 926,798 | Wilson | July 6, | 1909 |
| 1,525,928 | Fitch | Feb. 10, | 1925 |
| 1,606,441 | Nelms | Nov. 9, | 1926 |
| 2,295,370 | Tritt | Sept. 8, | 1942 |
| 2,314,550 | Olman | Mar. 23, | 1943 |
| 2,459,443 | Mabry | Jan. 18, | 1949 |
| 2,680,523 | Heeter | June 8, | 1954 |
| 2,770,513 | Brown | Nov. 13, | 1956 |
| 2,817,566 | Herman | Dec. 24, | 1957 |